(12) United States Patent
Pan

(10) Patent No.: US 9,121,946 B2
(45) Date of Patent: Sep. 1, 2015

(54) AUTOMOBILE WITH ANTI-COLLISION FUNCTION AND ANTI-COLLISION METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventor: An-An Pan, Shenzhen (CN)

(73) Assignees: Fu Tai Hua Industry (Shenzhen) Co. Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/256,957

(22) Filed: Apr. 19, 2014

(65) Prior Publication Data

US 2015/0081185 A1 Mar. 19, 2015

(30) Foreign Application Priority Data

Sep. 13, 2013 (CN) .......................... 2013 1 4170789

(51) Int. Cl.
| | |
|---|---|
| *G06F 7/70* | (2006.01) |
| *G01S 17/93* | (2006.01) |
| *B60T 7/12* | (2006.01) |
| *B60T 7/22* | (2006.01) |
| *G01S 17/42* | (2006.01) |

(52) U.S. Cl.
CPC ................. *G01S 17/936* (2013.01); *B60T 7/12* (2013.01); *B60T 7/22* (2013.01); *G01S 17/42* (2013.01); *B60T 2201/022* (2013.01)

(58) Field of Classification Search
USPC .......................................................... 701/70
See application file for complete search history.

(56) References Cited

U.S. PATENT DOCUMENTS

| | | | | |
|---|---|---|---|---|
| 5,200,606 A * | 4/1993 | Krasutsky et al. | ............ | 250/216 |
| 6,470,271 B2 * | 10/2002 | Matsunaga | .................... | 701/301 |
| 7,030,968 B2 * | 4/2006 | D'Aligny et al. | ............ | 356/5.01 |
| 7,271,880 B2 * | 9/2007 | Samukawa et al. | .......... | 356/4.01 |
| 7,301,497 B2 * | 11/2007 | Roddy et al. | .................. | 342/176 |
| 8,050,863 B2 * | 11/2011 | Trepagnier et al. | ........... | 701/514 |
| 2002/0060784 A1 * | 5/2002 | Pack et al. | .......................... | 356/6 |
| 2002/0143506 A1 * | 10/2002 | D'Aligny et al. | ................. | 703/6 |
| 2002/0198632 A1 * | 12/2002 | Breed et al. | ........................ | 701/1 |
| 2003/0140775 A1 * | 7/2003 | Stewart | ........................ | 89/41.05 |
| 2012/0327236 A1 * | 12/2012 | Kiyohara et al. | ............. | 348/148 |

* cited by examiner

*Primary Examiner* — Hussein A. Elchanti
(74) *Attorney, Agent, or Firm* — Novak Druce Connolly Bove + Quigg LLP

(57) ABSTRACT

An automobile includes a main body, and an infrared detecting unit on the front portion of the main body. The infrared detecting unit includes an infrared emitter connected to a motor, and an infrared receiver. An anti-collision method includes controlling the motor to rotate to rotate the infrared emitter. Controlling the rotating infrared emitter at each rotated position to emit infrared lights with an effective projection range L which form an illuminating trajectory spaced from the front portion by a distance S. Calculating a height of a protruding portion on the road surface according to the effective projection range L, the distance S, and the distance between the infrared detecting unit and the road surface H, if the infrared receiver receives the reflected infrared lights reflected by the protruding portion. Actions are preformed to protect the automobile if the calculated height is greater than a preset value.

6 Claims, 4 Drawing Sheets

AUTOMOBILE WITH ANTI-COLLISION FUNCTION AND ANTI-COLLISION METHOD

BACKGROUND

1. Technical Field

The present disclosure relates to automobiles, and particularly to an automobile having an anti-collision function and an anti-collision method applied to the automobile.

2. Description of Related Art

Automobiles have become essential means of transport in modern society. Many automobiles include anti-collision systems. A typical anti-collision system is made up of several distance measuring devices and several image sensing systems, which enable measuring safe distances between automobiles when moving, then the anti-collision system activates the brake system or warning device of the automobile, thereby substantially reducing accident occurrence. However, installation of such kind of anti-collision system is difficult and expensive.

Therefore, what is needed is a means to solve the problem described above.

BRIEF DESCRIPTION OF THE DRAWINGS

Many aspects of the present disclosure should be better understood with reference to the following drawings. The modules in the drawings are not necessarily drawn to scale, the emphasis instead being placed upon clearly illustrating the principles of the present disclosure. Moreover, in the drawings, like reference numerals designate corresponding portions throughout the views.

DETAILED DESCRIPTION

Figure 1:
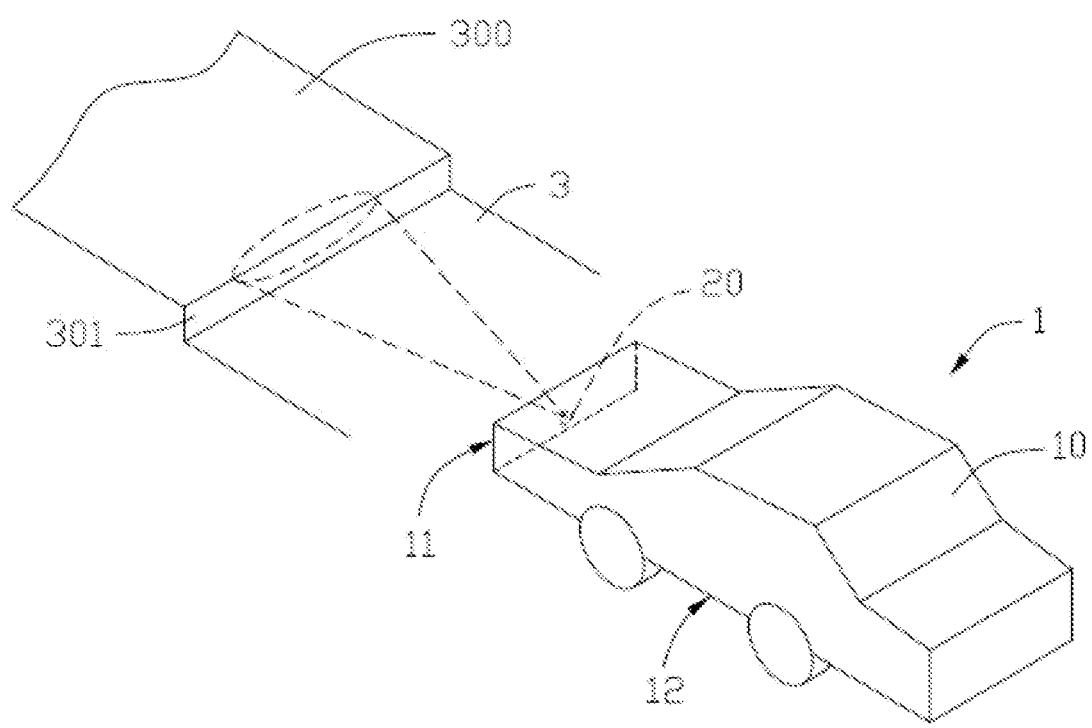
FIG. 1 is a schematic view showing an embodiment of an automobile for emitting infrared lights on an object.
Figure 2:
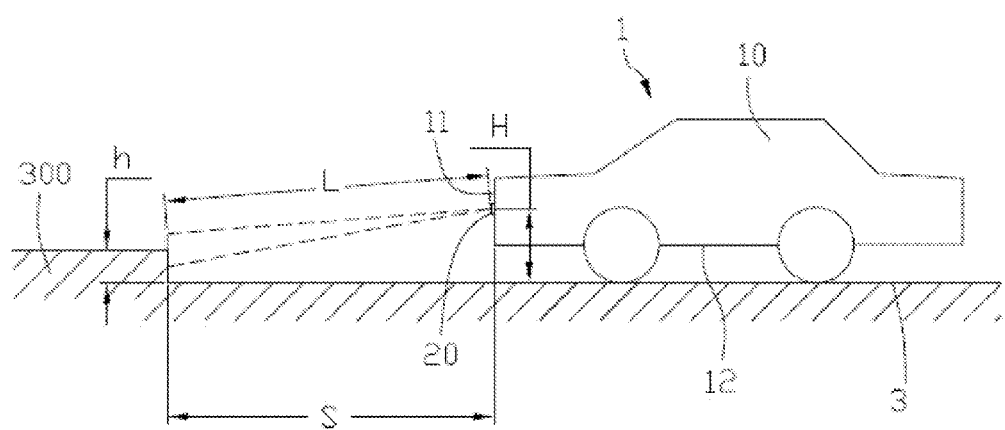
FIG. 2 is similar to FIG. 1, but showing an embodiment of the automobile in another perspective.

FIGS. 1-2 are schematic views of an automobile 1. The automobile 1 includes a main body 10 and an infrared detecting unit 20. The main body 10 includes a front portion 11. The infrared detecting unit 20 is arranged on the front portion 11, and the distance of the infrared detecting unit 20 with respect to the road surface 3 is defined as H. Also referring to FIG. 3, in the embodiment, the infrared detecting unit 20 includes an infrared emitter 201 and an infrared receiver 202. The infrared emitter 201 is connected to a motor (not shown), and rotatable with respect to the main body 10 when driven by the motor. The infrared emitter 201 emits infrared lights of different directions when rotating. The infrared receiver 202 receives the infrared lights reflected by a protruding portion 300 on the road surface 3 in front of the automobile 1.

Figure 3:
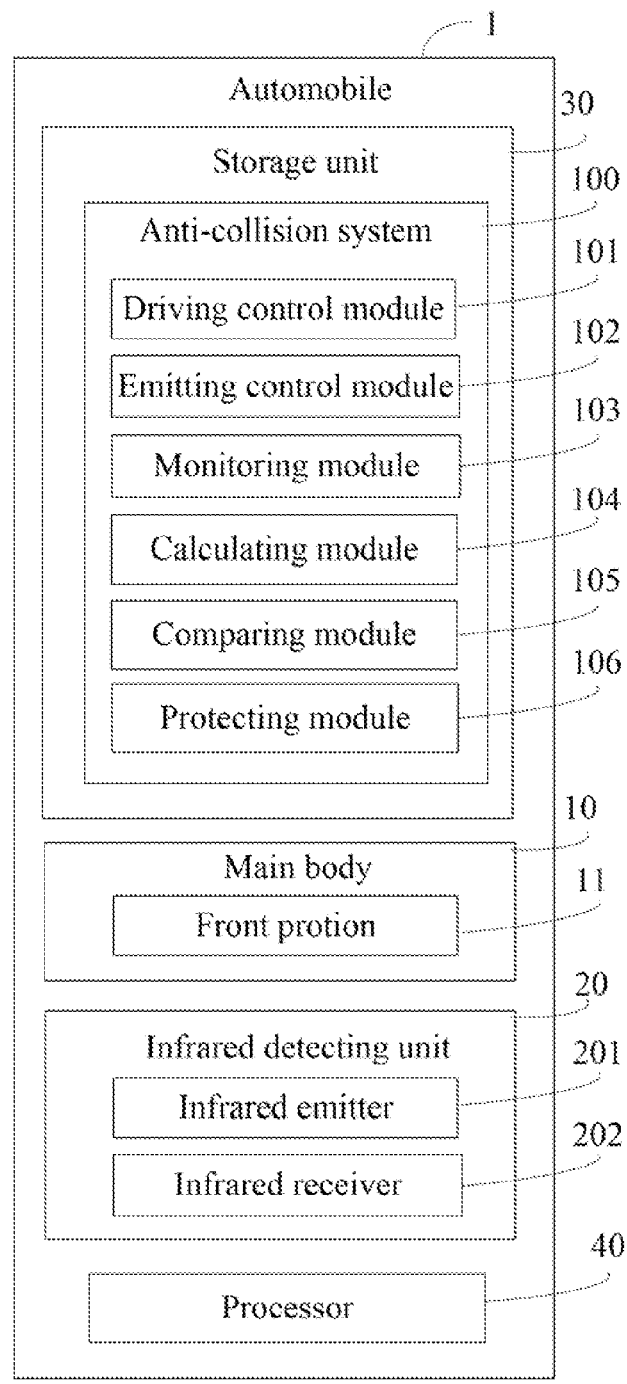
FIG. 3 is a block diagram of an embodiment of an anti-collision system used in the automobile of FIGS. 1-2.

Referring to FIG. 3, the automobile 1 further includes a storage unit 30 and a processor 40. The storage unit 30 stores an anti-collision system 100. The system 100 includes a variety of modules executable by the processor 40. In the embodiment, the system 100 includes a driving control module 101, an emitting control module 102, a monitoring module 103, a calculating module 104, a comparing module 105, and a protecting module 106.

The driving control module 101 controls the motor to rotate, thus rotating the infrared emitter 201.

The emitting control module 102 controls the rotating infrared emitter 201 at each rotated position to emit infrared lights with an effective projection range L. When there is an object (e.g., the protruding portion 300) spaced from the front portion 11 by a preset distance S, the emitted infrared lights may form an illuminating trajectory on the object. In the illustrated embodiment, the protruding portion 300 has a side surface 301 perpendicularly to the road surface 3. When a distance between the automobile 1 and the protruding portion 300 is less than the preset distance S, the infrared lights are able to be reflected off the protruding portion 300. If a height h of the protruding portion 300 is great enough, some of the reflected infrared lights are able to reach the infrared receiver 202.

The monitoring module 103 detects whether the infrared receiver 202 receives any reflected infrared lights.

The calculating module 104 calculates the height h of the protruding portion 300 according to the effective projection range L, the preset distance S, and the distance H, if the monitoring module 103 detects that the infrared receiver 202 receives reflected infrared lights. In detail, the preset distance S is much larger than a width of the illuminating trajectory, thus the calculating module 104 can calculate the height of the protruding portion 300 which is described as a function h (H, L, S):

$$h = H - \sqrt{L^2 - S^2}.$$

The comparing module 105 compares the calculated height h with a preset value.

The protecting module 106 takes certain actions to protect the automobile 1 if the calculated height h is greater than the preset value. In the embodiment, the preset value is the height of the lower portion 12 of the main body 10 with respect to the road surface 3. The control module 106 takes actions to protect the automobile 1 if the calculated height h is greater than the height of the lower portion 12 of the main body 10 with respect to the road surface 3, thereby preventing the main body 10 from colliding with the protruding portion 300. In the embodiment, the protecting module 106 generates an audio signal to alert the driver. In an alternative embodiment, the protecting module 106 may activate the brake system of the automobile 1.

In an alternative embodiment, the infrared detecting unit 20 may include a number of infrared emitters 201 to emit infrared lights of different directions to form the illuminating trajectory, and an infrared receiver 202 to receive the reflected infrared lights. In this case, the driving control module 101 is omitted. The emitting control module 102 controls each of the infrared emitters 201 to emit infrared lights with the effective projection range L.

Figure 4:
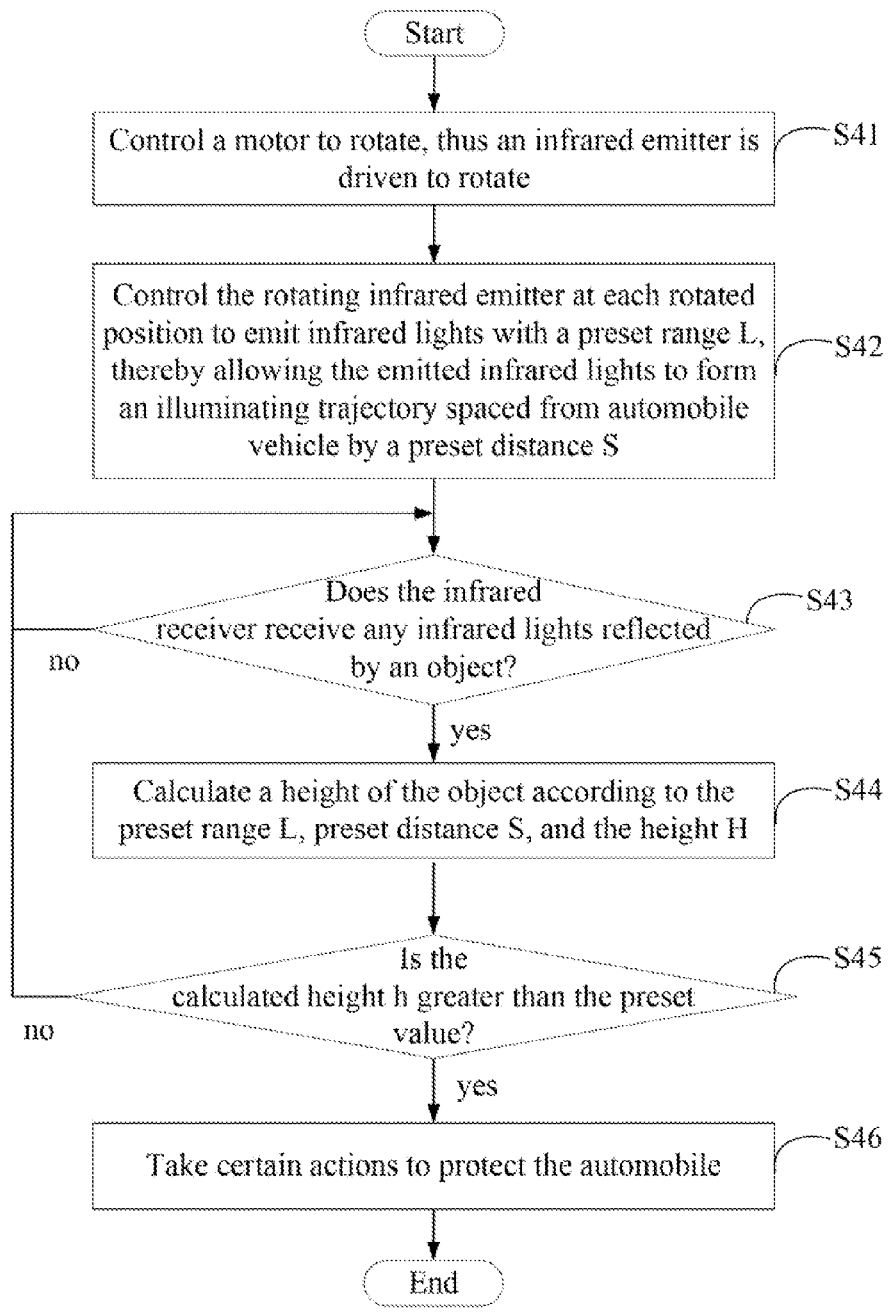
FIG. 4 is a flowchart of an embodiment of an anti-collision method.

FIG. 4 is a flowchart of an embodiment of an anti-collision method.

In step S41, the driving control module 101 controls the motor to rotate, thus rotating the infrared emitter 201.

In step S42, the emitting control module 102 controls the rotating infrared emitter 201 at each rotated position to emit infrared lights with an effective projection range L. The emitted infrared lights forms an illuminating trajectory spaced a preset distance S from the front portion 11.

In step S43, the monitoring module 103 detects whether the infrared receiver 202 receives any reflected infrared lights, if so, the procedure goes to step S44; otherwise, step S43 is repeated.

In step S44, the calculating module 104 calculates a height h of the protruding portion 300 according to the effective projection range L, the preset distance S, and the distance H. In detail, the preset distance S is much larger than a width of the illuminating trajectory, thus the calculating module 104 can calculate the height of the protruding portion 300 which is described as a function h (H, L, S):

$$h = H - \sqrt{L^2 - S^2}.$$

In step S45, the comparing module 105 compares the calculated height h with a preset value. If the calculated height h is greater than the preset value, the procedure goes to step S46; otherwise, the procedure goes back to step S43.

In step S46, the protecting module 106 takes certain actions to protect the automobile 1.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. An automobile comprising:
   a main body comprising a front portion;
   an infrared detecting unit arranged on the front portion, a distance of the infrared detecting unit with respect to a road surface being defined as H, the infrared detecting unit comprising an infrared emitter connected to a motor and an infrared receiver;
   a storage unit storing a plurality of modules; and
   a processor to execute the plurality of modules,
   wherein the plurality of modules comprises:
      a driving control module to control the motor to rotate, and rotated the infrared emitter;
      an emitting control module to control the rotating infrared emitter at each rotated position to emit infrared lights with an effective projection range L, and the emitted infrared lights forming an illuminating trajectory spaced from the front portion by a preset distance S;
      a monitoring module to detect whether the infrared receiver receives any infrared lights reflected by a protruding portion on the road surface;
      a calculating module to calculate a height h of the protruding portion according to the effective projection range L, the preset distance S, and the distance H, if the monitoring module detects that the infrared receiver receives the reflected infrared lights, wherein L is the effective projection range of the emitted infrared lights, S is the preset distance between the illuminating trajectory and the front portion, and H is the distance of the infrared detecting unit with respect to the road surface;
      a comparing module to compare the calculated height h with a preset value; and
      a protecting module to take certain actions to protect the automobile if the calculated height h is greater than the preset value.

2. The automobile of claim 1, wherein the calculating module is configured to calculate the height h of the protruding portion which is described as a function h (H, L, S):

$$h = H - \sqrt{L^2 - S^2}.$$

3. The automobile of claim 1, wherein the preset value is a height of a lower portion of the main body with respect to the road surface, the control module is configured to take actions to protect the automobile if the calculated height h is greater than the height of the lower portion.

4. The automobile of claim 1, wherein the certain actions comprise generating an audio signal to alert the driver.

5. The automobile of claim 1, wherein the certain actions comprise activating a brake system of the automobile.

6. An anti-collision method applied in a automobile, the automobile comprising a main body and an infrared detecting unit, the main body comprising a front portion, the infrared detecting unit arranged on the front portion, a distance of the infrared detecting unit with respect to a road surface being defined as H, the infrared detecting unit comprising an infrared emitter connected to a motor and an infrared receiver, the method comprising:
   controlling the motor to rotate, and rotating the infrared emitter;
   controlling the rotating infrared emitter at each rotated position to emit infrared lights with an effective projection range L, and the emitted infrared lights forming an illuminating trajectory spaced from the front portion by a preset distance S;
   detecting whether the infrared receiver receives any infrared lights reflected by a protruding portion on the road surface;
   calculating a height h of the protruding portion according to the effective projection range L, the preset distance S, and the distance H, if the monitoring module detects that the infrared receiver receives the reflected infrared lights, wherein L is the effective projection range of the emitted infrared lights, S is the preset distance between the illuminating trajectory and the front portion, and H is the distance of the infrared detecting unit with respect to the road surface;
   comparing the calculated height h with a preset value; and
   taking certain actions to protect the automobile if the calculated height h is greater than the preset value.

\* \* \* \* \*